INVENTORS
William L. Riggs
Chester L. Sharp
Lee O. Sanders

INVENTORS
William L. Riggs
Chester L. Sharp
Lee O. Sanders ns # United States Patent Office 2,854,740
Patented Oct. 7, 1958

2,854,740
FLANGE SPREADER

William L. Riggs, Chester L. Sharp, and Lee O. Sanders, Tulsa, Okla.

Application November 30, 1956, Serial No. 625,300

1 Claim (Cl. 29—253)

This invention relates to a tool for separating abutting flange members and more particularly, but not by way of limitation, to a tapering cam lever member for the spreading of flanges on pipe line connections, and the like.

The pipe sections of a pipe line are often coupled together by mating flange members which are bolted together to form a continuous pipe line. Similarly, valves and other fittings are often interposed in the pipe line by mating flange members. When it is necessary to separate the pipe joint or remove the fitting from the pipe line for any reason, such as for repair or replacement of worn parts, the flanges are usually unbolted and separated or moved apart by force. Flange spreading tools available today usually comprise a tapered or pointed end portion adapted to be forced radially between a pair of abutting flange members by means of a threaded shank member. The screw shank member normally must be turned through a great many revolutions and with a considerable manual force in order to wedge the pointed tool between the flanges for separation thereof.

The present invention contemplates a tapering cam flange spreading tool provided with a lever arm member which greatly facilitates the separating of the flange members. The novel tool is provided with a cam member adapted for rotation in a plane substantially parallel to the plane of the flange members. The member is designed and constructed with tapering or diverging side walls which function to move the flange members apart as the cam member is rotated by the lever arm. The peripheral configuration of the cam member provides for a progressive radial engagement thereof between the flange members, thereby cooperating with the tapering side wall portions in the spreading of the flanges. The lever arm member facilitates the rotation of the cam member for wedging of the tapered portion thereof between the flanges, and eliminates the need for a threaded shank member. The novel flange separating tool is simple and efficient in operation and durable and economical in construction.

It is an important object of this invention to provide a flange spreading tool so designed and constructed to progressively engage between the abutting flange members in a wedging action for separating the flanges.

It is another object of this invention to provide a tapering cam lever for separating abutting flange members wherein the cam member is rotated in a plane substantially parallel with the plane of the flange members with a leverage action which greatly facilitates the separating of the flanges.

Still another object of this invention is to provide a novel leverage tool for the separating of abutting flange members which may be easily attached to the flange members in a manner to position the tool for a wedging action between the flanges for separation thereof.

And still another object of this invention is to provide a flange separating tool which is economical and durable in construction and simple and efficient in operation.

Other objects and advantages of the invention will be evident from the following detailed description, read in conjunction with the accompanying drawings, which illustrate our invention.

Figure 1:
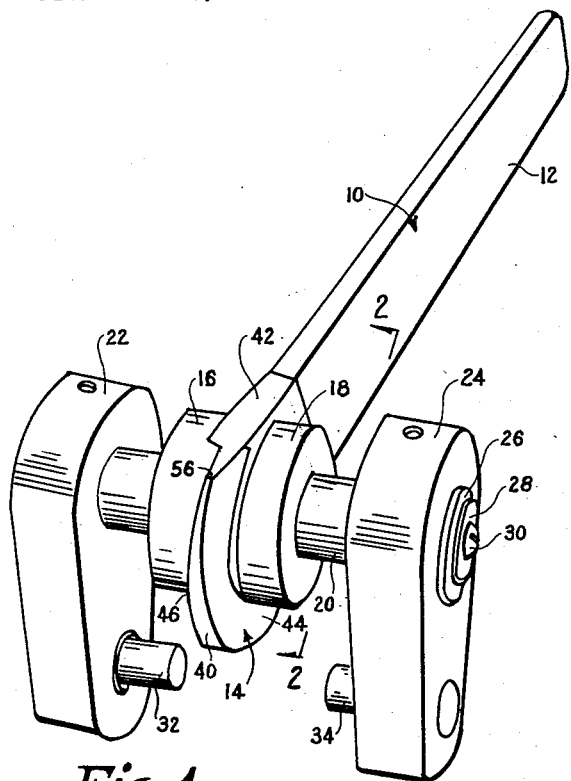
Figure 1 is a perspective view of a flange separating tool embodying the invention.

Referring to the drawings in detail, reference character 10 refers in general to a tapering cam lever tool for spreading abutting flange members. The tool 10 comprises a lever arm 12 provided with a cam member 14 suitably secured by welding, or the like, at one end thereof. Apertured hub members 16 and 18 are provided on the opposed faces of the cam member 14 and extend axially outwardly therefrom to receive a transverse pivot shaft member 20 therethrough. A pair of similar side plate members 22 and 24 are slidably disposed on the opposite ends of the shaft member 20 and are retained thereon by means of suitable washer members 26 and 28 and bolts or screws 30. The side plate 22 is provided with an inwardly directed transverse pin member 32 which is disposed in substantial axial alignment with a complementary pin member 34 provided on the side plate member 24. The pin members 32 and 34 may be rigidly secured to the plate members 22 and 24 for attaching the tool member 10 to the pipe flanges 36 and 38 (Fig. 3) in a manner as will be hereinafter set forth.

Figure 2:
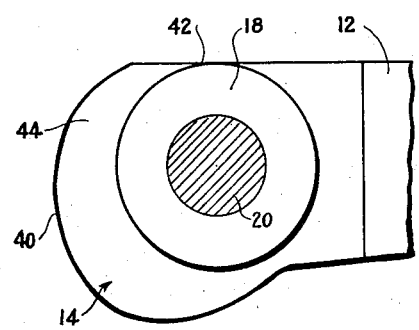
Figure 2 is a section view taken on line 2—2 of Fig. 1, with certain portions deleted for purposes of illustration.

The cam member 14 is provided with an arcuate peripheral edge portion 40 which extends substantially therearound. The uppermost portion of the cam member 14 as viewed in Figs. 1 and 2 is provided with a flat edge surface 42 to permit clearance for the flange members 36 and 38 when the lever tool member 10 is in operation for spreading of the flanges. The configuration of the cam arcuate edge portion 40 is progressive so that the periphery of the cam member 14 increases in radial distance from the axis of the pivot shaft 20 in a direction from the flat surface 42 around the cam member 14. The side wall portions 44 and 46 are diverging in a direction toward each other at the smallest radial dimension of the cam member 14. In this manner, a substantially wedge type configuration is provided for the cam member 14 for facilitating the separating of the flange members 36 and 38.

Operation

Figure 3:
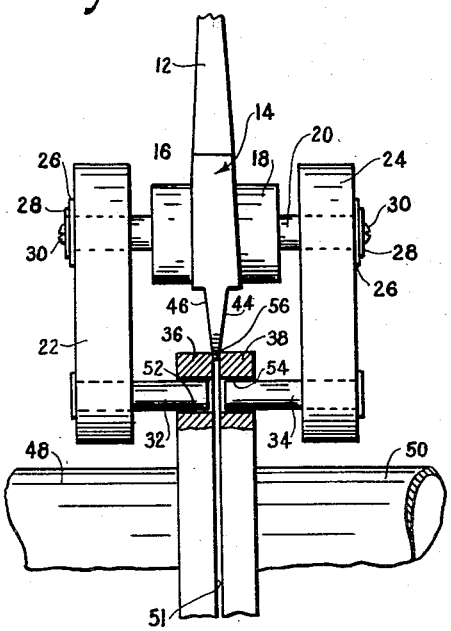
Figure 3 is an end elevational view of the novel flange spreader in position to separate flange members and with portions shown in section for clarity.

Pipe line sections, such as shown in Fig. 3 at 48 and 50, are often secured in tandem relation by means of the abutting flange members 36 and 38. The flanges 36 and 38 are usually bolted together in any well known manner (not shown) to provide a continuous pipeline. The pipe joint at the flanges is usually sealed by means of a flat gasket member (not shown) disposed between the abutting faces of the flanges. Thus, the flanges are spaced slightly apart to provide a narrow opening 51 (Fig. 3). When it is necessary to separate the flanges for any reason, such as for replacing the gasket member therebetween (not shown), or the like, it is usually necessary to remove the bolts from the flanges and force the flange members apart. After the bolt members have been removed, the novel cam lever tool 10 may be quickly and easily installed on the flanges for spreading thereof. The length of the pivot shaft 20 is preferably sufficient to permit clearance for the abutting flange members 36 and 38 between the inwardly directed pin members 32 and 34. Thus, the side plate members 22 and 24 may be manually disposed over the flanges in order that one of the pin members, such as the pin 32, may be inserted within one of the bolt holes 52 of the flange member 36. The side plate 24 may then be manually adjusted by sliding along the shaft 20 so that the pin member 34 may be inserted with the aligned bolt hole 54 of the flange 38.

As hereinbefore set forth, the flat edge portion 42 of the cam member provides for clearance between the cam member and the flanges in order that the smallest portion 56 of the wedge configuration of the cam 14 may be disposed adjacent the abutment of the flanges 36 and 38. The portion 56 will be disposed slightly between the flanges 36 and 38 in the opening 51 provided therebetween by the flange gasket member as hereinbefore set forth. The lever arm member 12 may then be manually actuated to pivot or rotate the cam member 14 about the pivot shaft 20. This rotating motion urges the diverging side walls 44 and 46 between the flange members 36 and 38 to force the flanges apart by a wedging action. It will be apparent that simultaneous with the wedging of the cam member 14 between the flanges, the progressively increasing radial length of the cam peripheral portion 40 will move the cam 14 into a greater engagement between the flanges, thereby facilitating the spreading apart thereof.

The pivoting or rotating of the cam member by the lever may be repeated as often as necessary to spread the flange members 36 and 38 apart sufficiently for replacing worn parts, or removal of the pipe fittings. It will be apparent that the novel tool 10 may be utilized for the spreading of abutting flange members of many types of installations, and is not limited to pipe line operation.

*Modification*

Figure 5:
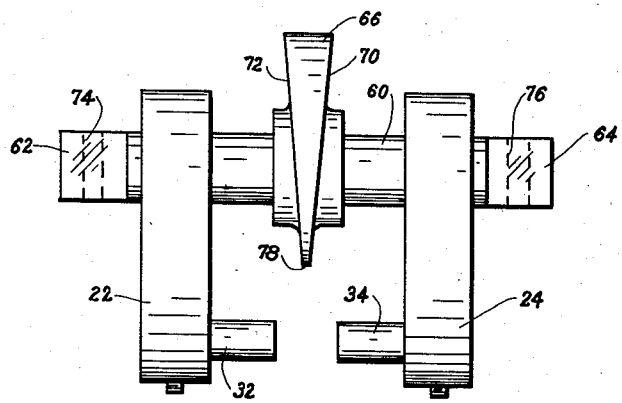
Figure 5 is an end elevational view of a modified form of flange spreader.
Figure 6:
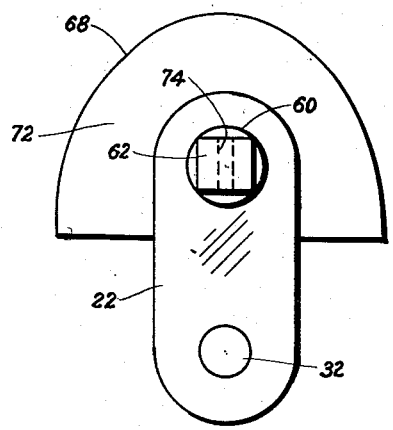
Figure 6 is a side elevational view of the flange spreader shown in Fig. 5.

A modified form of the invention is shown in Fig. 5. The side plate members 22 and 24 such as utilized in the preferred embodiment are spaced apart by means of a transverse shaft member 60. The shaft member 60 extends through the side plate members 22 and 24 and is preferably rotatably journalled therein in any suitable manner (not shown). The opposite end portions 62 and 64 of the shaft member 60 are preferably square or rectangular in cross section as shown in Fig. 6 for receiving a socket type handle or lever member (not shown), as will be hereinafter set forth. A cam member 66 is centrally disposed on the shaft 60 interposed between the side plates 22 and 24 and is preferably rigidly keyed or suitably secured to the shaft 60. The cam member 66 is provided with an arcuate outer periphery 68 similar to the outer periphery of the cam member 14 of the preferred embodiment. The opposite side faces 70 and 72 (Fig. 5) of the cam member 66 are diverging to provide a substantially wedge shaped configuration for the cam member 66 as is clearly shown in Fig. 5. The end members 62 and 64 of the shaft 60 are each preferably provided with a bore 74 and 76 extending transversely therethrough.

In operation, the pin members 32 and 34 of the side plate members 22 and 24, respectively, may be inserted within the aligned apertures 52 and 54 of the flange members 36 and 38 in the manner hereinbefore set forth in the operation of the preferred embodiment. The smallest portion 78 of the wedge shaped cam member 66 may be positioned adjacent the opening 51 between the flanges 36 and 38. In order to rotate the cam member 66 in a manner for spreading the flanges as hereinbefore set forth, a suitable socket type lever member (not shown) may be disposed on either or both of the end members 62 and 64. If desired, a pin member or the like (not shown) may be utilized in cooperation with the bores 74 and 76 for securing the socket handle rigidly to the end members 62 and 64 during operation of the tool. The handle member may then be manually manipulated for rotating the shaft member 60 within the side plate members 22 and 24. This rotation is transmitted through the shaft 60 to the cam member 66 to urge the diverging side wall portions 70 and 72 between the flanges members 36 and 38 to force the flanges apart by a wedging action. The modification shown in Figs. 5 and 6 permits the utilization of a separate handle member in lieu of the handle integral with the cam portion as shown in the preferred embodiment.

Figure 4:
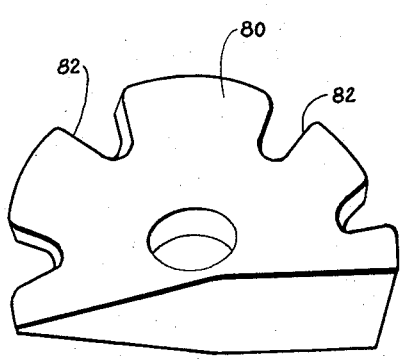
Figure 4 is a perspective view of a modification of the cam member of the invention.

It is anticipated that a cam member 80 shown in Fig. 4 may be utilized in a similar manner as hereinbefore set forth for spreading the abutting flange members. The cam member 80 is a substantially wedge shaped configuration similar to the cam members 14 and 66. However, the arcuate periphery thereof may be provided with a plurality of circumferentially spaced recesses or grooves 82. The grooves 82 are provided to receive the end of a suitable lever or handle member (not shown). The grooves 82 in cooperation with the handle member may function in a manner similar to a ratchet for urging the wedge shaped configuration of the cam member 80 between the abutting flange members 36 and 38 in the manner as hereinbefore set forth.

From the foregoing, it will be apparent that the present invention provides a novel tapering cam lever member for spreading or separating abutting flange members. The cooperating wedge shaped configuration and arcuate cam surface of the novel flange spreader device provides for a progressive engagement of the cam member between the abutting flanges, and the leverage action provided for operation of the cam member greatly facilitates the separating of the flange members. The novel tool is of simple and durable construction and is economical and efficient in operation.

Changes may be made in the combination and arrangement of parts as heretofore set forth in the specification and shown in the drawings, it being understood that any modification in the precise embodiment of the invention may be made within the scope of the following claim without departing from the spirit of the invention.

We claim:

A tool for separating abutting flange members and comprising a lever arm member, a cam member rigidly secured to one end of the lever arm, said cam member provided with diverging side walls of a substantially wedge configuration, a progressive radial arcuate configuration outer periphery provided on the cam member, a transverse pivot shaft member journalled in the cam member and extending therethrough, side plate members slidably disposed on the opposite ends of the pivot shaft, aligned pin members provided in the plate members in vertical spaced relation to the pivot shaft for securing the tool in position on the abutting flange members whereby the cam member may be progressively wedged between the flanges for a separating thereof.

References Cited in the file of this patent

UNITED STATES PATENTS

| | | |
|---|---|---|
| 2,352,290 | Saul et al. | June 27, 1944 |
| 2,502,849 | Jennings | Apr. 4, 1950 |

FOREIGN PATENTS

| | | |
|---|---|---|
| 927,654 | France | Nov. 5, 1947 |